United States Patent [19]
Washisu et al.

[11] Patent Number: 5,020,369
[45] Date of Patent: Jun. 4, 1991

[54] IMAGE STABILIZING OPTICAL DEVICE

[75] Inventors: Koichi Washisu, Tokyo; Ichiro Ohnuki, Yokohama; Toru Nagata, Kawasaki, all of Japan

[73] Assignee: Canon Kabushiki Kaisha, Tokyo, Japan

[21] Appl. No.: 350,854

[22] Filed: May 12, 1989

[30] Foreign Application Priority Data

May 13, 1988 [JP] Japan ............................ 63-116099
May 25, 1988 [JP] Japan ............................ 63-128067

[51] Int. Cl.$^5$ ............................................ G01P 15/08
[52] U.S. Cl. ............................................ 73/517 A
[58] Field of Search ............... 73/517 A, 514, 488, 73/509; 340/669; 200/61.45 R; 354/202

[56] References Cited

U.S. PATENT DOCUMENTS 2,738,968 3/1956 Fleischel ............................ 73/509

Primary Examiner—Jerry W. Myracle
Attorney, Agent, or Firm—Fitzpatrick, Cella, Harper & Scinto

[57] ABSTRACT

An angular acceleration meter, for use in an image stabilizing optical device, is provided with a seesaw rotatably supported about an angular acceleration detecting axis and constitutes a detecting mass, in which the seesaw is shaped as an arc form with curved or polygonal surface symmetric with a respect to the detecting axis.

26 Claims, 18 Drawing Sheets

F I G. 12
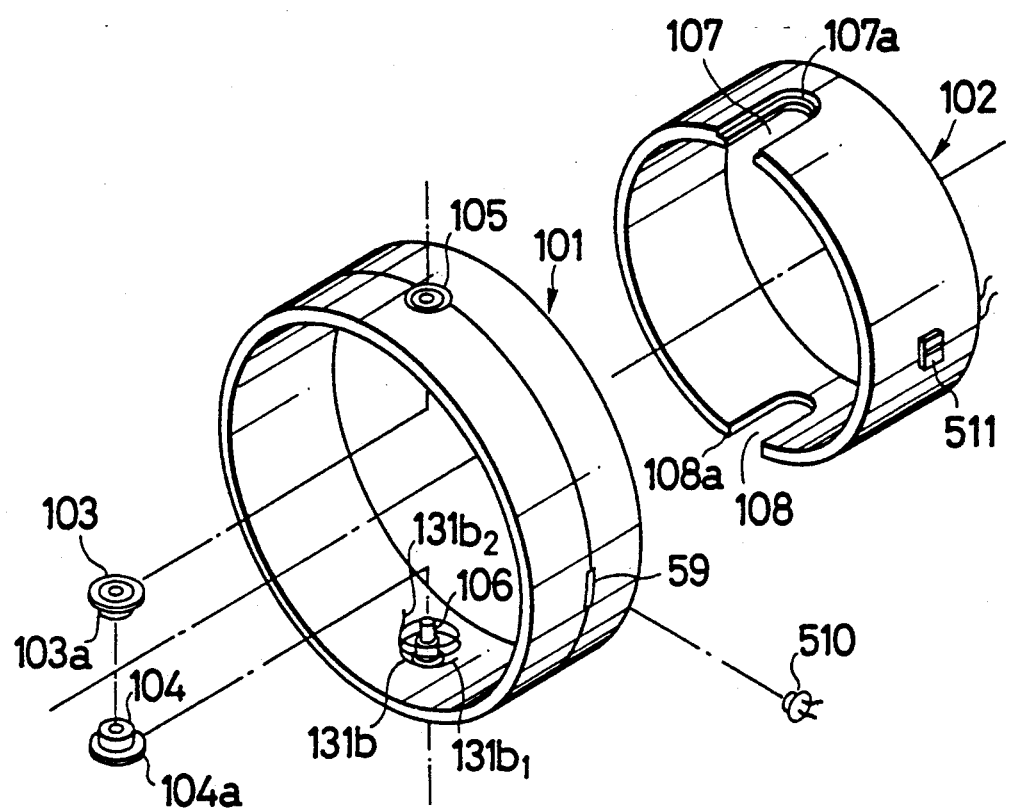

IMAGE STABILIZING OPTICAL DEVICE

BACKGROUND OF THE INVENTION

1. Field of the Invention

The present invention relates to an angular acceleration meter adapted for detection of vibration in an equipment subjected to vibration of a relatively low frequency, and more particularly to an angular acceleration meter for use, in an image stabilizing optical device, adapted for use for example, in a camera or the like for the purpose of detecting vibration of a frequency of 1 to 12 Hz (for example caused by hand shaking) and utilizing the detected information for image stabilizing.

2. Related Background Art

In the following, there will be explained related background arts of the present invention, with particular reference to photographic cameras.

Recent cameras are almost free from errors in photographing even for a beginner because critical operations such as determination of exposure or focusing are automated, but errors resulting from camera shaking cannot still be prevented in automatic manner.

For this reason there have recently been made developments for cameras capable of preventing errors in photographing resulting from camera shaking, particularly those resulting from hand shaking of the photographer.

In order to obtain a photograph without image blur even due to such hand shaking, which is generally a vibration of a frequency of 1 to 12 Hz, is present when the camera shutter is released, it is necessary to detect the vibration of camera caused by said hand shaking and to move a correcting lens in the direction of vibration of the camera, according to thus detected value. Thus, for attaining the above-mentioned object of obtaining a photograph without image blur even in the presence of camera shaking, it is essential to precisely detect the vibration of the camera, particularly that caused by hand shaking.

In principle, the vibration of a camera can be detected by a system including an acceleration meter releasing an acceleration signal, and an integrator for integrating said acceleration signal or integrating the output of said integrator, thereby releasing a velocity signal or a displacement signal.

Now reference is made to FIG. 15 for explaining a camera vibration detecting system utilizing an angular acceleration meter.

FIG. 15 shows a system for detecting a vertical vibration (pitching) 44a of the camera and a horizontal vibration (yawing) 44b. The camera is provided with a lens barrel 42, and two angular acceleration meters 43a₁, 43b₁ for respectively detecting angular accelerations in the pitching and yawing directions 43a₂ and 43b₂.

Known analog integrating circuits 47a, 47b integrate the angular acceleration signal from the angular acceleration meters 43a₁, 43a₂ once to obtain the velocity of hand shaking or twice to obtain the displacement thereof. Thus obtained signals are utilized for activating a correcting optical system 48 based on known velocity control or displacement control (including drive units 48a₁, 48b₁ and position sensors 48a₂, 48b₂), thereby moving said correcting optical system 48 corresponding to the hand shaking and stabilizing the image on an image plane 49.

For constructing an image stabilizing system for detecting very delicate vibrations distributed in a low frequency region of 1 to 12 Hz, such as those encountered in a camera, there is required a highly precise angular acceleration sensor. FIG. 6 shows the structure of a conventional servo angular acceleration meter suitable for such purpose.

Referring to FIG. 16, bottom portions 51a, 51b of outer frame support, in cooperation with cover portions 52a, 52b of the outer frame and low-friction 25 bearings 53a, 53b such as ball bearings, both ends of a shaft 54 which rotatably suspends a seesaw 56 bearing coils 55a, 55b. The seesaw 56 is affixed on said shaft 54.

Above and below said coils 55a, 55b and said seesaw 56, and distanced therefrom, there are provided magnetic circuit plates constituting the cover portions 52a, 52b and permanent magnets $57a_1$, $57a_2$, $57b_1$ and $57b_2$. As explained above, the magnetic circuit plates serve also as the covers of the outer frame. Said permanent magnets $57a_1$, $57a_2$, $57b_1$, $57b_2$ are mounted on magnetic circuit rear plates 58a, 58b fixed on the bottom portions 51a, 51b of the outer frame.

In the center of the coil 55a provided on said seesaw 56, there is formed a vertically penetrating slit 59. Above said slit 59 there is provided a lightemitting device 510 such as an infrared light emitting diode, fixed on the cover portion 52a serving as the upper magnetic circuit plate, and below said slit 59 there is provided a photoelectric position sensor 511 such as a position sensitive device (PSD) fixed on the magnetic circuit rear plate 58a.

When an angular acceleration a is applied, as indicated by an arrow 512, to the outer frame shown in FIG. 16, the seesaw 56 rotates in a relative motion in a direction opposite to the angular acceleration, and the angle of rotation can be detected from the position of the light beam from the light emitting device 510 transmitted by the slit 59 and falling on the position sensor 511.

The magnetic fluxes from said permanent magnets $57a_1$, $57b_1$ pass through the circuits of permanent magnets $57a_1$, $57b_1$ —coils 55a, 55b —magnetic circuit plates 52a, 52b —coils 55a, 55b —permanent magnets $57a_2$, $57b_2$ while those from the permanent magnets $57a_2$, $57b_2$ pass through the circuits of permanent magnets $57a_2$, $57b_2$ —magnetic circuit rear plates 58a, 58b —permanent magnets $57a_1$, $57b_1$ to constitute a closed magnetic circuit in their entirety, with magnetic fluxes perpendicular to the coils 55a, 55b. A control current in the coils 55a, 55b rotates the seesaw 56 opposite to the direction of said acceleration according to Flemming's law.

FIG. 17 shows an example of an acceleration detecting circuit to be employed in the above-explained acceleration meter. Said circuit is composed of serial connection of a position detecting amplifier 513 for amplifying the output from the aforementioned position sensor 511; a compensating circuit 514 for stabilizing the feedback system; a transistor circuit 515 for amplifying the output current from said position detecting amplifier 513 for supply to the coils 55a, 55b; said coils 55a, 55b; and a resistor 516. In the present embodiment, the direction of winding of said coils 55a, 55b and the polarity of the permanent magnets $57a_1$, $57b_1$, $57a_2$, $57b_2$ are so determined that said coils 55a, 55b, when energized, generate a force in a direction opposite to the rotating direction of the seesaw 56 resulting from the external angular acceleration.

The working principle of the above-explained angular acceleration meter now will be explained. When an external angular acceleration a is applied to said angular acceleration meter, the seesaw 56 rotates, by inertia, in the opposite direction relative to the outer frame, whereby the slit 59 provided on the seesaw 56 moves in a direction L shown in FIG. 17. Thus the position of the beam from the light emitting device 510 displaces on the position sensor 511, and the position sensor 511 generates an output proportional to the amount of displacement.

Said output is amplified by the position detecting amplifier 513 shown in FIG. 17, then further current amplified in the transistor circuit 515 and supplied to the coils 55a, 55b.

The above-explained control current in the coils 55a, 55b generate, in the seesaw 56, a force in a direction R opposite to the direction L of the external angular acceleration a, and said control current is so regulated that the light beam entering the position sensor 511 returns to the initial position in the absence of the external angular acceleration a.

The control current in the coils 55a, 55b is proportional to the rotating force applied to the seesaw 56, and said rotating force is proportional to the force for returning the seesaw to the initial position, or the magnitude of the external angular acceleration a. Therefore, the magnitude of the angular acceleration a, required as control information for an image stabilizing system for a camera, can be determined by measuring the control current as a voltage across the resistor 516.

FIGS. 18 and 19 illustrate angular acceleration meters of different types. The structure shown in FIG. 18 is different from that shown in FIG. 16 in the absence of the coils 55a, 55b and the permanent magnets 57a₁, 57a₂, 57b₁, 57b₂ In the structure shown in FIG. 18, there is provided a spiral spring of which an end 71a is mounted on the seesaw 56 while the other end is fixed to a point 73b of the cover portion 52a. In the structure shown in FIG. 19, the shaft 54 is replaced by a plate spring 81 of which hatched portions 81a, 81b are fixed on notches 82a, 82b of the outer frame portions 51a, 52a. Also the light emitting device 511 is omitted.

In these angular acceleration meters, the seesaw rotates, by the angular acceleration, to a point of balance with the force of the spiral spring 71 or the plate spring 81, and the amount of displacement is detected by a photosensor 511 in case of FIG. 18, or by a strain gauge 83a, 83b of resistor type or semiconductor type in case of FIG. 19.

Such acceleration meters are inferior in the precision of measurement to the servo acceleration meter but are significantly less expensive because of the absence of the magnets, coils and control circuit.

However such angular acceleration meters are associated, due to the structures thereof, with certain drawbacks which now will be explained with reference to FIG. 20.

FIG. 20 shows the angular acceleration meter shown in FIG. 16, incorporated in the lens tube 42 shown in FIG. 15, seen in the axial direction from the front side of the lens.

Since the seesaw 56, shaft 54, ball bearings 53a, 53b and outer frame portions 51a, 52a have to be accommodated between an outer frame 42a and an inner tube 42b of the lens tube, there is inevitably required a large thickness 91, leading to a large dimension of the lens. Such a larged-sized lens inevitably has an increased weight and is very tiring for the photographer in the hand-held use. Such heavy lens tube will be extremely unpopular even if it can attain the anticipated object of preventing the hand shaking.

On the other hand, a reduction in said thickness requires the use of a smaller seesaw 56 in order to prevent the contact of the ends 56R, 56L of said seesaw 56 with the outer frame 42a of the lens tube 42, and the resulting decrease of the sensing mass gives rise to a loss in the sensitivity for detecting the angular acceleration.

Besides, when the force of gravity is applied in a direction g in FIG. 20, the seesaw 56, with its center of gravity 9G positioned above the ball bearing 53b principally supporting said seesaw 56, constitutes an inverted pendulum vibrating on said ball bearing 53b. Also the ball bearings 53a, 53b have minute plays, and the precision of the output of the angular acceleration meter is significantly deteriorated, even for a small vibration, due to the multiplying effect of the instability of the inverted pendulum and said plays in the ball bearings.

SUMMARY OF THE INVENTION

The object of the present invention is to provide an angular acceleration meter for use in an image stabilizing optical device, enabling compactization of a curved mounting member such as a lens barrel, having an excellent durability and capable of detecting the angular acceleration with a high sensitivity.

The above-mentioned object can be achieved, according to the present invention, by an angular acceleration meter provided with a seesaw member constituting a sensing mass and supported rotatably about an acceleration detecting axis and designed to detect the angular acceleration from the rotational displacement of said seesaw, wherein said seesaw is formed in an arc shape with curved or polygonal surface, symmetric about said detecting axis. Thus, by forming the curvature of the seesaw according to that of the curved mounting member, said member can be thinner without sacrificing the detecting sensitivity. Also the center of gravity of the seesaw can be positioned inside the inner supporting end of the shaft of the seesaw. It is thus rendered possible to obtain an angular acceleration meter, for use in an image stabilizing optical device, capable of preventing the generation of play in the bearing supporting the seesaw shaft, reducing the error in the detected angular acceleration and detecting the angular acceleration with a high precision.

Other objects of the present invention will become fully apparent from the following description of embodiments.

BRIEF DESCRIPTION OF THE DRAWINGS

FIG. 12 is an exploded perspective view of an eighth embodiment of the angular acceleration meter;

DETAILED DESCRIPTION OF THE PREFERRED EMBODIMENTS

Now the present invention will be clarified in detail by embodiments thereof shown in the attached drawings.

Figure 18:
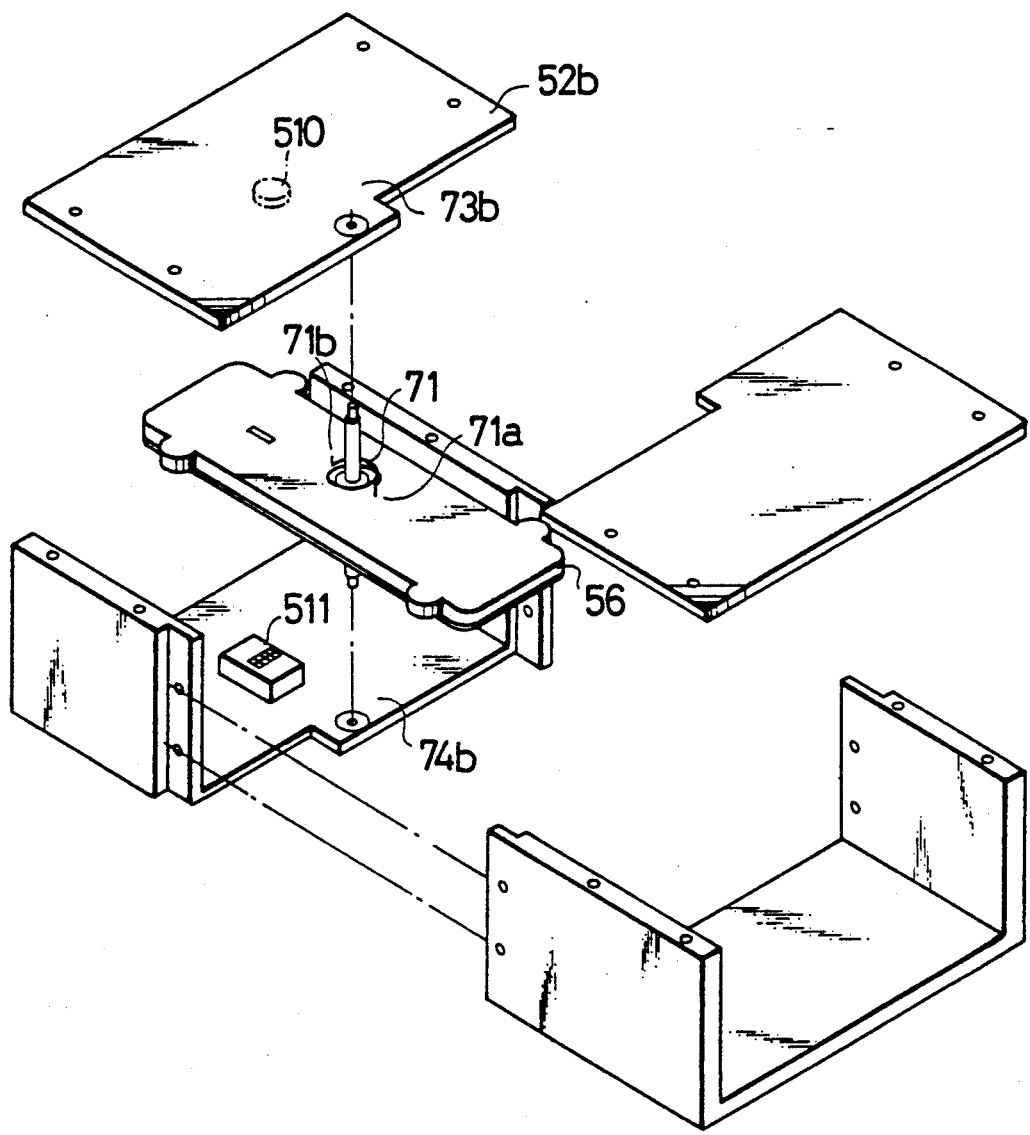
Figure 19:
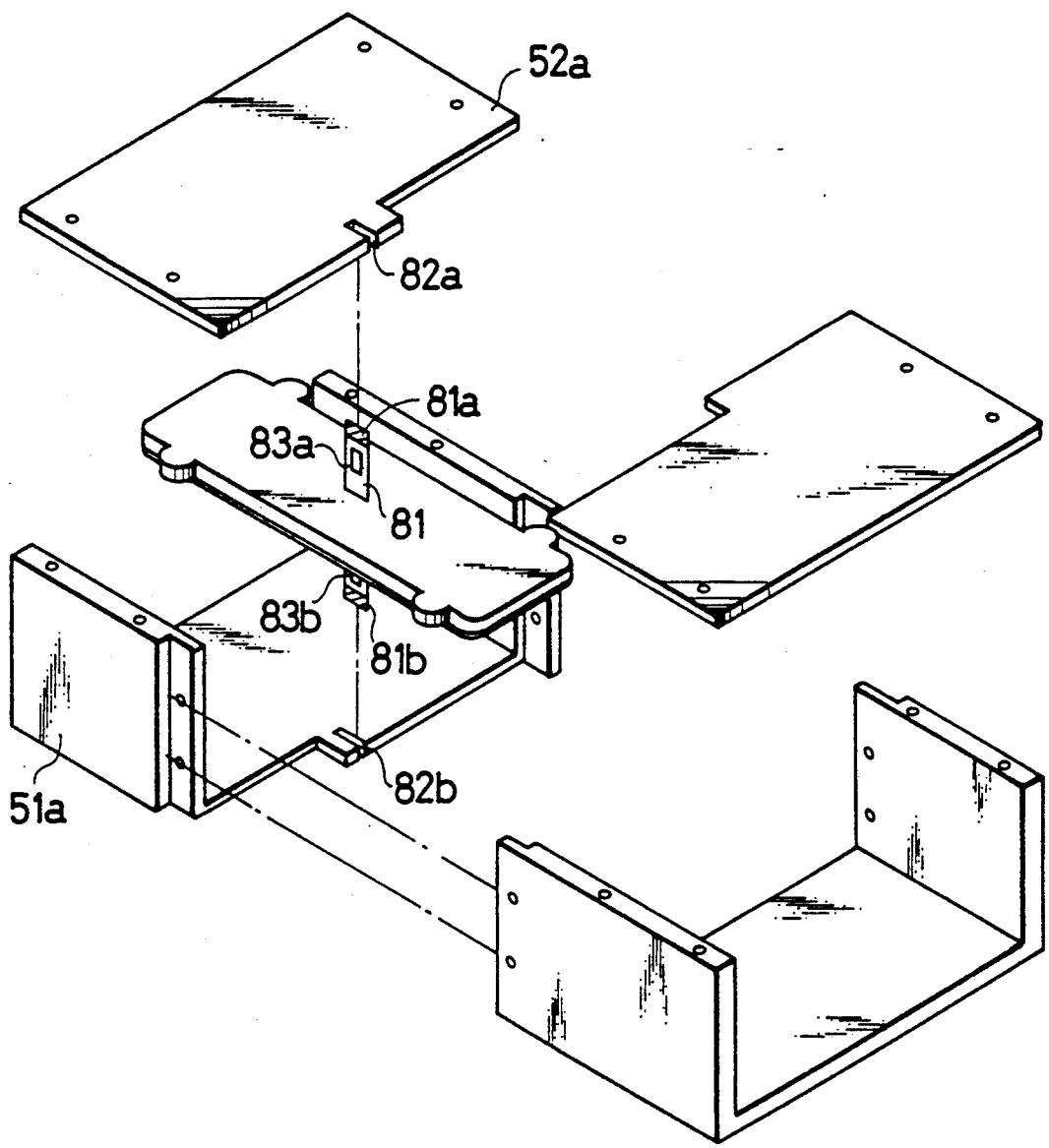
Figure 20:
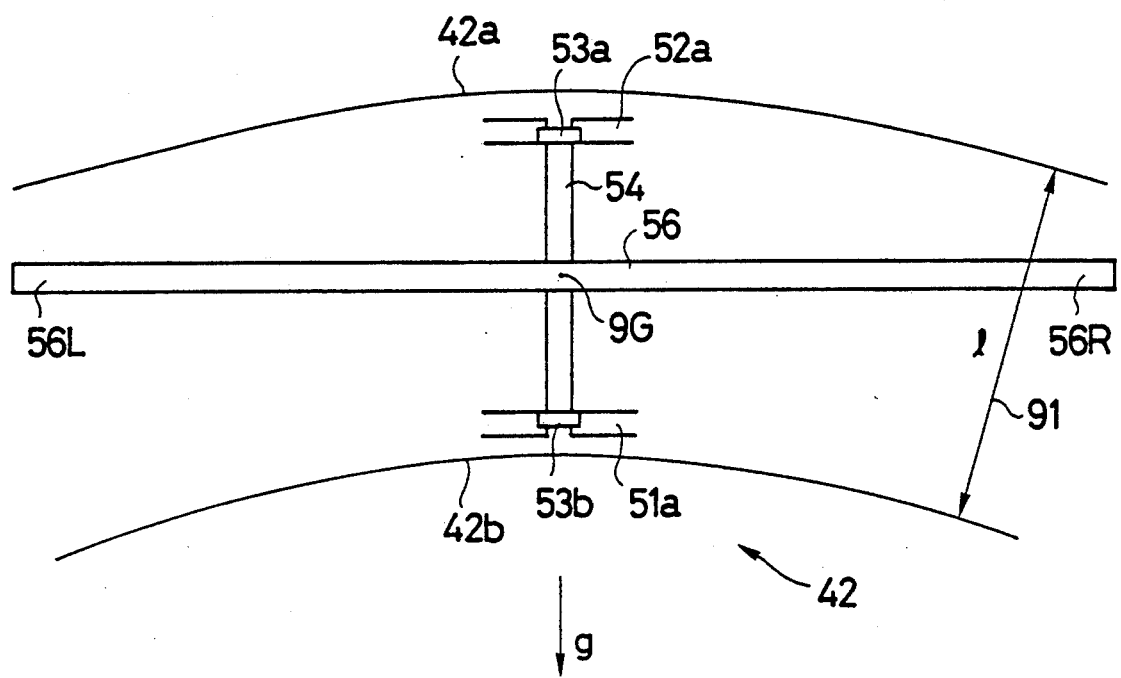
FIG. 20 is a front view of the lens tube shown in FIG. 15 in which the angular acceleration meter shown in FIG. 16 is incorporated.

In the following embodiments, same components as those aforementioned in FIGS. 18 to 20 will be represented by same numbers and will not be explained further.

[First embodiment]

Figure 1A:
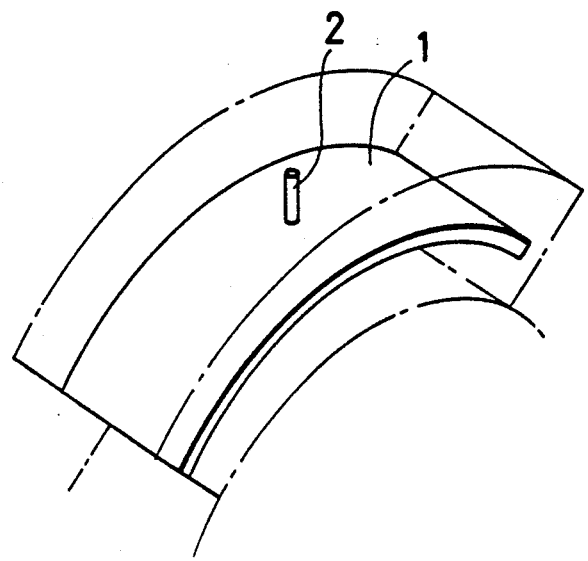
FIGS. 1A, 1B and 1C are perspective views of a first embodiment of the angular acceleration meter of the present invention.
Figure 1B:
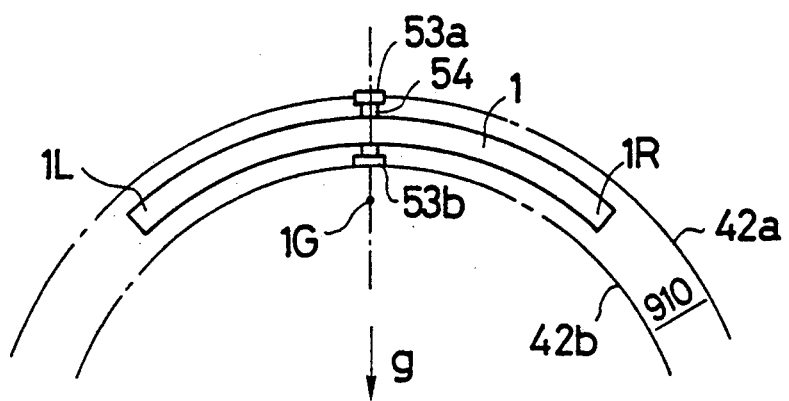
Figure 1C:
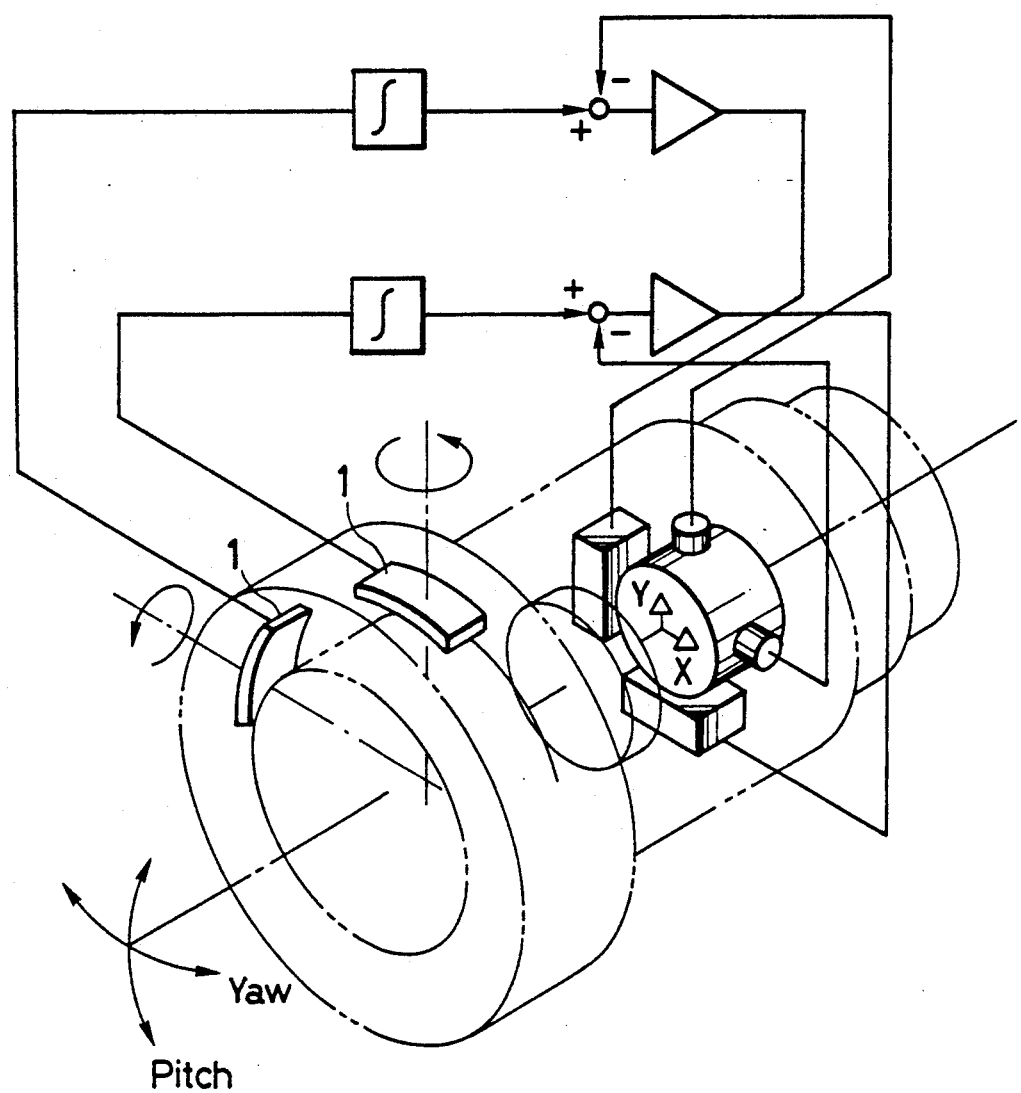

FIGS. 1A and 1B are respectively a schematic perspective view and a front view of a first embodiment of the angular acceleration meter of the present invention, and FIG. 1C is a perspective view of a lens tube incorporating said angular acceleration meter.

In the present embodiment, a plate-shaped seesaw 1, constituting a sensing mass of the angular acceleration meter, is curved in the direction of length, symmetrically with respect to a shaft 2 which penetrates the center of said plate. Said shaft 2 is rotatably supported at both ends thereof for example with ball bearings 53a, 53b as in the conventional structure shown in FIG. 20. The both ends 1R, 1L of the seesaw 1 are so extended beyond the inner ball bearing 53b that the center of gravity 1G of the seesaw 1 is positioned inside the inner ball bearing 53b whereby said seesaw 1 assumes the form of "a balancing toy".

Figure 16:
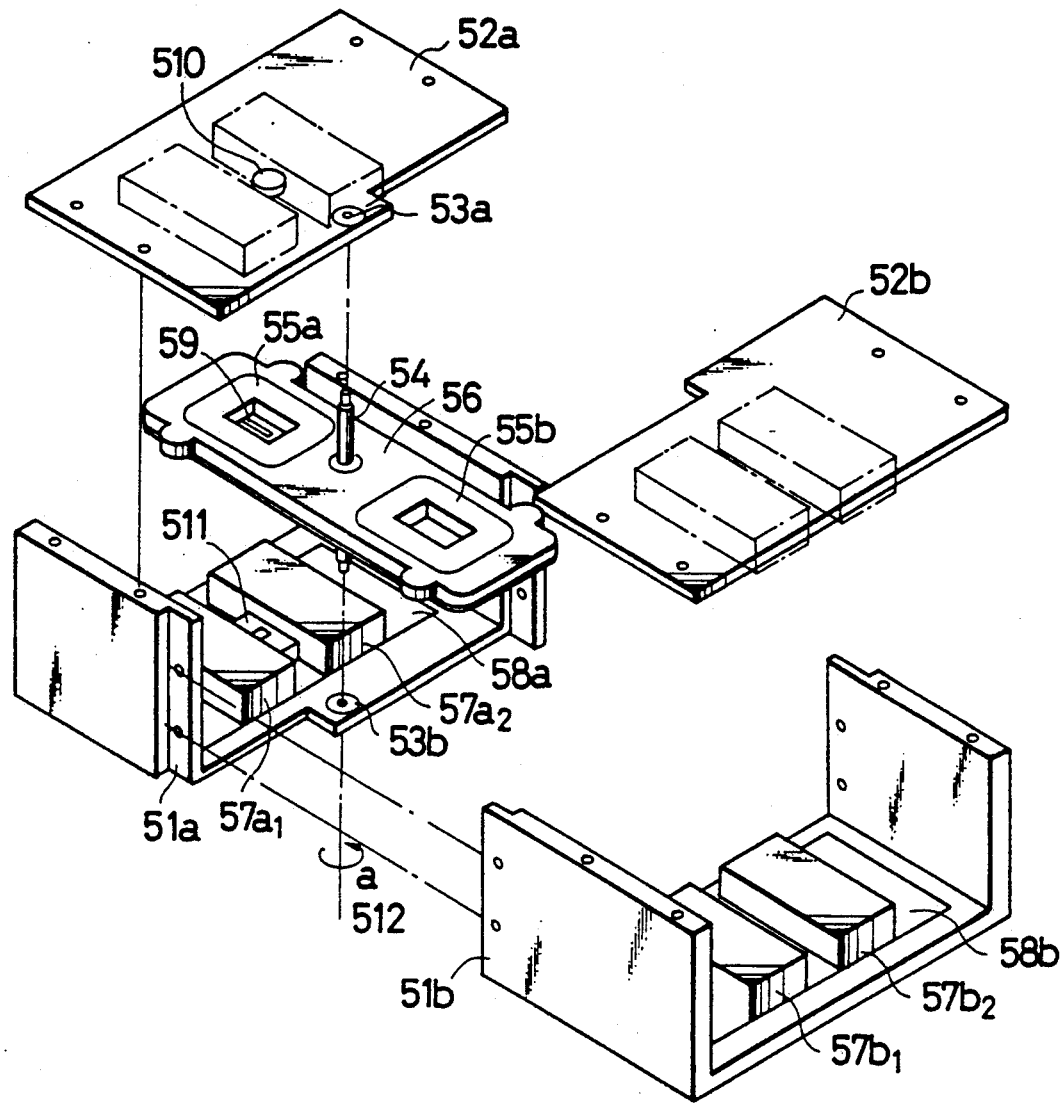
FIGS. 16, 18 and 19 are exploded perspective view of examples of angular acceleration meter.

In case the angular acceleration meter is mounted in a lens tube as explained before, the curvature of the seesaw 1 is selected equal to that of the lens tube around the optical axis thereof, so that the seesaw 1 can be accommodated between the outer frame 42a and the inner frame 42b of the lens tube. As shown in FIG. 16, the seesaw 1 may be provided with coils having a slit therein, while a light-emitting device, a position sensor, permanent magnets and magnetic circuit rear plates may be provided on a fixed member. Otherwise, as shown in FIG. 18, a slit is provided in the seesaw 1 while a light-emitting device and a position sensor are provided on a fixed member, and a spiral spring is provided between the shaft 2 and the fixed member.

Since the seesaw 1 is formed corresponding to the curvature of the outer and inner frames 42a, 42b of the lens tube, the ends 1L, 1R of the seesaw 1 do not touch the outer frame 42a. The thickness 910 of the lens tube can therefore be reduced without any change in the dimension of the seesaw 1. Also the seesaw 1, being formed as a balancing toy with the center of gravity thereof below the inner ball bearing 53b as shown in FIG. 1B, is extremely stable even in the presence of certain play in the ball bearings 53a, 53b and can prevent the loss in the detecting precision.

Figure 2A:
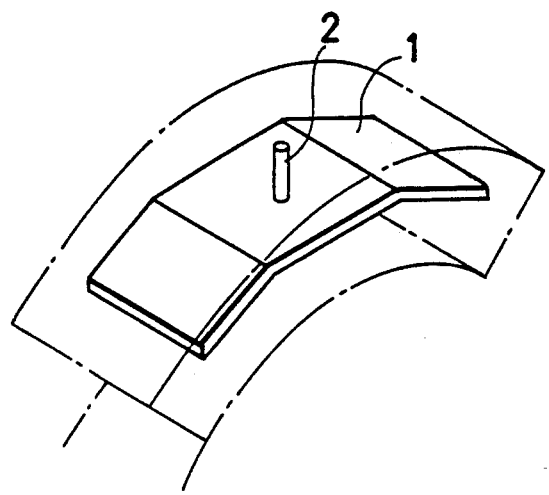
FIGS. 2A and 2B are perspective views showing variations of said first embodiment.

In the present embodiment, the seesaw 1 is curved with a uniform curvature, but it may also be polygonally formed as shown in FIG. 2A.

Figure 2B:
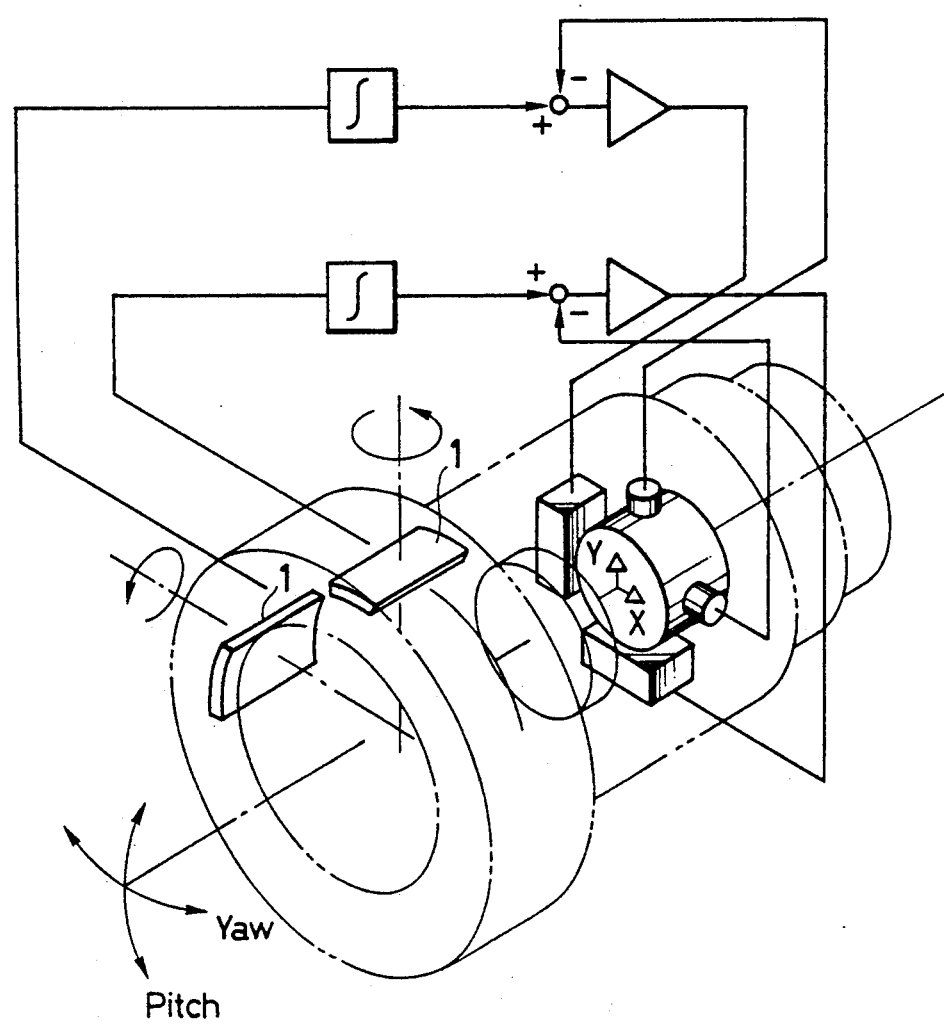

Also the seesaw 1 may be curved, not in the direction of length thereof, but in the direction of width thereof as shown in FIG. 2B and the direction of length may be positioned along the optical axis.

The angular acceleration meter need not necessarily be installed at the front end portion of the lens barrel but may naturally be installed in the middle or rear portion of the lens tube.

[Second embodiment]

Figure 3A:
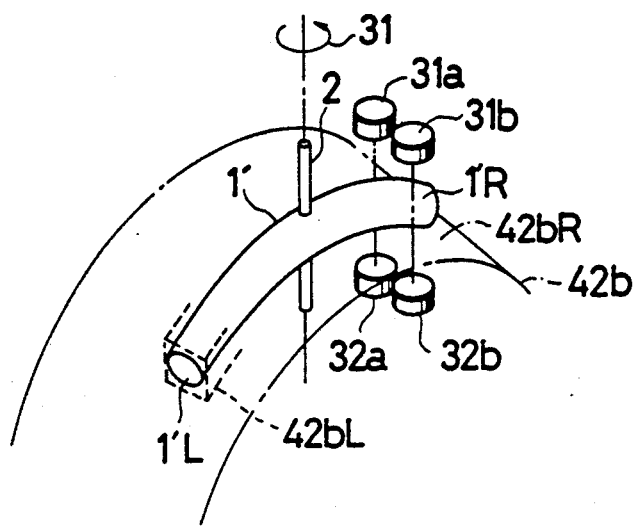
FIGS. 3A and 3B are respectively a schematic perspective view and a lateral view of a second embodiment.

FIG. 3 illustrates a second embodiment of the angular acceleration meter of the present invention.

In the present embodiment, the seesaw 1' is composed of a round rod member, curved as in the first embodiment. The use of a round rod member not only facilitates the fabrication but also provides the following advantages.

Figure 3B:
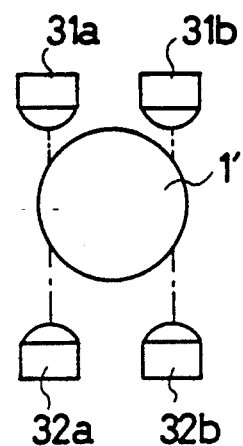

When the seesaw 1' performs a rotation 31 with the shaft 2 about the detecting axis, the amplitude of rotation is limited if the seesaw 1' has a rectangular cross section, by the contact of a broken-lined edge 1'L of the seesaw 1' with a chain-lined surface 42bL of the inner frame 42b of the lens tube. However the seesaw 1' of the present embodiment, being composed of a round rod member, is prevented from the contact of the end portion 1'L thereof with said surface 42bL and can have a larger rotating amplitude with an increased dynamic range of the angular acceleration. The rotating angle of said seesaw can be detected for example, as shown in FIG. 3B, by arranging light-emitting devices 31a, 31b and photosensors 32a, 32b in mutually opposed manner on both sides of the seesaw 1' and comparing the outputs of said photosensors 32a, 32b. Such detecting method is already known and will not, therefore, be explained in detail.

[Third embodiment]

Figure 4:
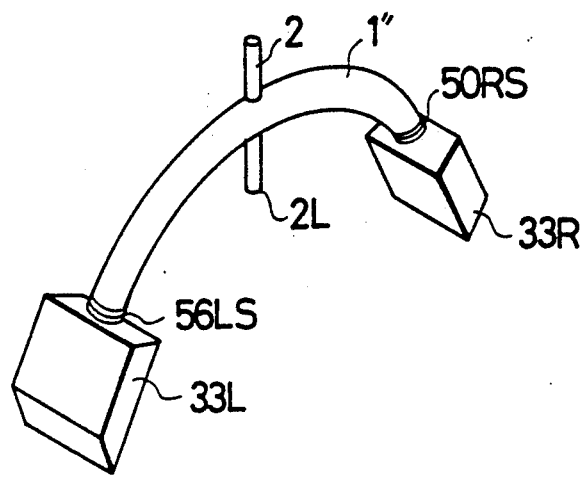
FIG. 4 is a perspective view of a third embodiment.

FIG. 4 illustrates a third embodiment of the angular acceleration meter of the present invention. The seesaw 1" of the present embodiment is composed of a round rod member as in the second embodiment, but is provided, on both ends thereof, with screw threads 56RS, 56LS on which weights 33R, 33L are screwed.

The presence of the weights on both ends of the seesaw 1" further improves the stability of the "balancing toy" composed of the seesaw 1" with the supporting point at the inner end 2L of the shaft 2, thereby improving the precision of angular acceleration measurement. Also an increased sensing mass improves the sensitivity to the angular acceleration, thus further improving the precision of measurement. Also the weights 33R, 33L, fixed on the seesaw 1" by screwing, enable fine adjustment of the balance of the seesaw 1".

The weights 33R, 33L need not necessarily be rectangular as illustrated, but can naturally be cylindrical or spherical.

[Fourth embodiment]

Figure 5:
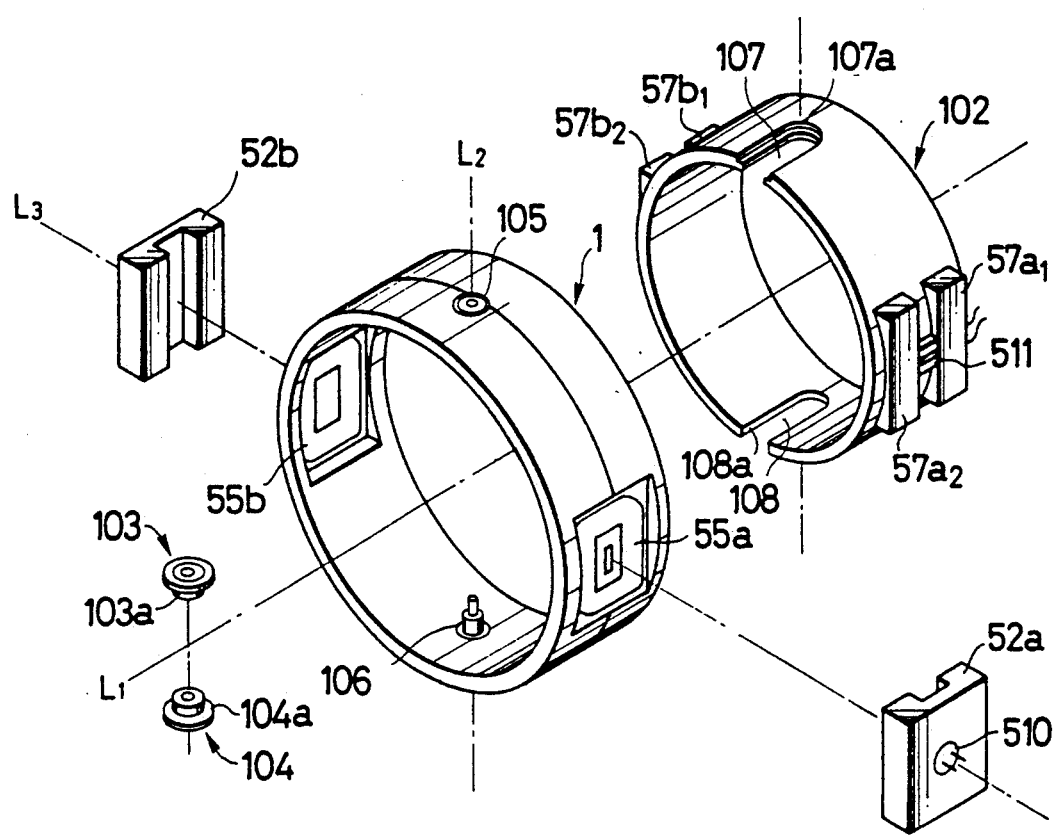
FIG. 5 is an exploded perspective view of a fourth embodiment of the angular acceleration meter of the present invention.

FIG. 5 is an exploded perspective view of a fourth embodiment of the angular acceleration meter of the present invention.

In FIG. 5 there are shown a first ring tube 101 formed as a cylinder, and a second ring tube 102 to be mounted in said first ring 101 concentrically therewith. On the periphery of said second ring 102 there are provided ball bearings 103, 104 on a first perpendicular axis L2 perpendicular perpendicular to the central axis L1. Also from the periphery of the first ring 101 there inwardly protrude shafts 105, 106 on said first perpendicular axis L2. Said shafts 105, 106 respectively engage with the bearings 103, 104 whereby the first ring 101 and the second tube 102 are rendered mutually rotatable about the first perpendicular axis L2.

The bearings 103, 104 are respectively provided with flanges 103a, 104a which are pressed into grooves 107a, 108a formed in U-shaped notches 107, 108 provided on the second ring 102, whereby said bearings 103, 104 are fixed on the second ring 102.

The first ring 101 is provided with a coil 55a having a slit 59 and another coil 55b, in positions corresponding to a second perpendicular axis L3 perpendicular to the central axis L1 and the first perpendicular axis L2. A magnetic circuit plate 52a having a light-emitting device 510 is fixed outside said coil 55a, and a magnetic circuit plate 52b is fixed outside the coil 55b.

On the second ring 102, permanent magnets 57a₁, 57a₂ are provided on the outer periphery, corresponding to the second perpendicular axis L3 or to the coil 55a with a mutual spacing therebetween along the central axis L1. Also permanent magnets 57b₁, 57b₂ are provided corresponding to the coil 55b, with a mutual spacing therebetween along the central axis L1. Said magnets constitute closed magnetic circuits in cooperation with the magnetic circuit plates 52a, 52b across the coils 55a, 55b. Between the permanent magnets 57a₁, 57a₂ there is provided a photoelectric position sensor 511 such as a position sensitive device (PSD) and receives the light from the light-emitting device 510, provided on the magnetic circuit plate 52a, through the slit 59.

Figure 17:
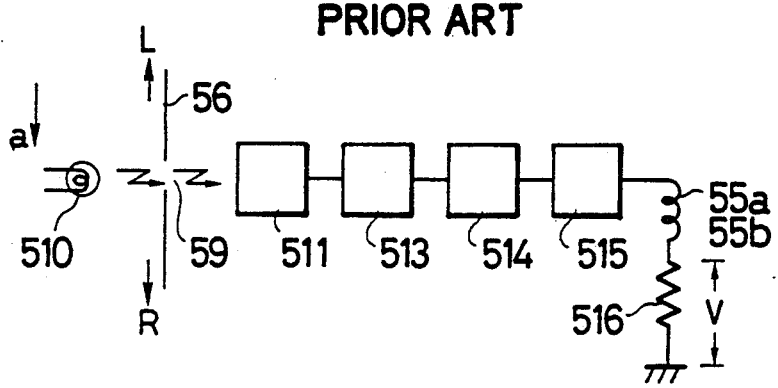
FIG. 17 is a block diagram of an acceleration detecting circuit.

The angular acceleration meter explained above can determine the magnitude of the angular acceleration, as the coils 55a, 55b, position sensor 511 and light-emitting device 510 are connected to a control circuit for example shown in FIG. 17 in a similar manner as in the foregoing embodiments.

More specifically, when an angular acceleration is generated about the first perpendicular axis L2, a relative rotation is generated between the first and second rings 101, 102 and the amount of rotation is detected by the position sensor 511. The coils 55a, 5b are energized by a control current so as to return the first ring 101 to the original position, and the magnitude of the angular acceleration is determined from the value of said control current.

The above-explained angular acceleration meter has the advantages that:

(1) The formation of play in the bearings can be reduced, as the distance between the bearings 103 and 104 can be made large;

(2) The cylindrical structure, with the bearings 103, 104 positioned symmetrically with respect to the central axis between the first and second rings 101, 102, can accommodate the optical system when it is incorporated in a lens tube. The lens tube can be compactized as the first and second rings 101, 102 can be made thin;

(3) The annular closed form of the first ring 101 provides a high rigidity without vibration. It is therefore possible to prevent play in the ball bearings and the breakage of the mounting portions and to avoid errors in the detected angular acceleration; and (4) The cylindrical form, encircling the optical system of the first ring 101 allows an increase in size and mass, and the sensitivity of angular acceleration detection can be improved by thus increased moment of inertia.

In the present embodiment, either of the first second rings 101, 102 may be selected as the fixed structure.

Figure 6:
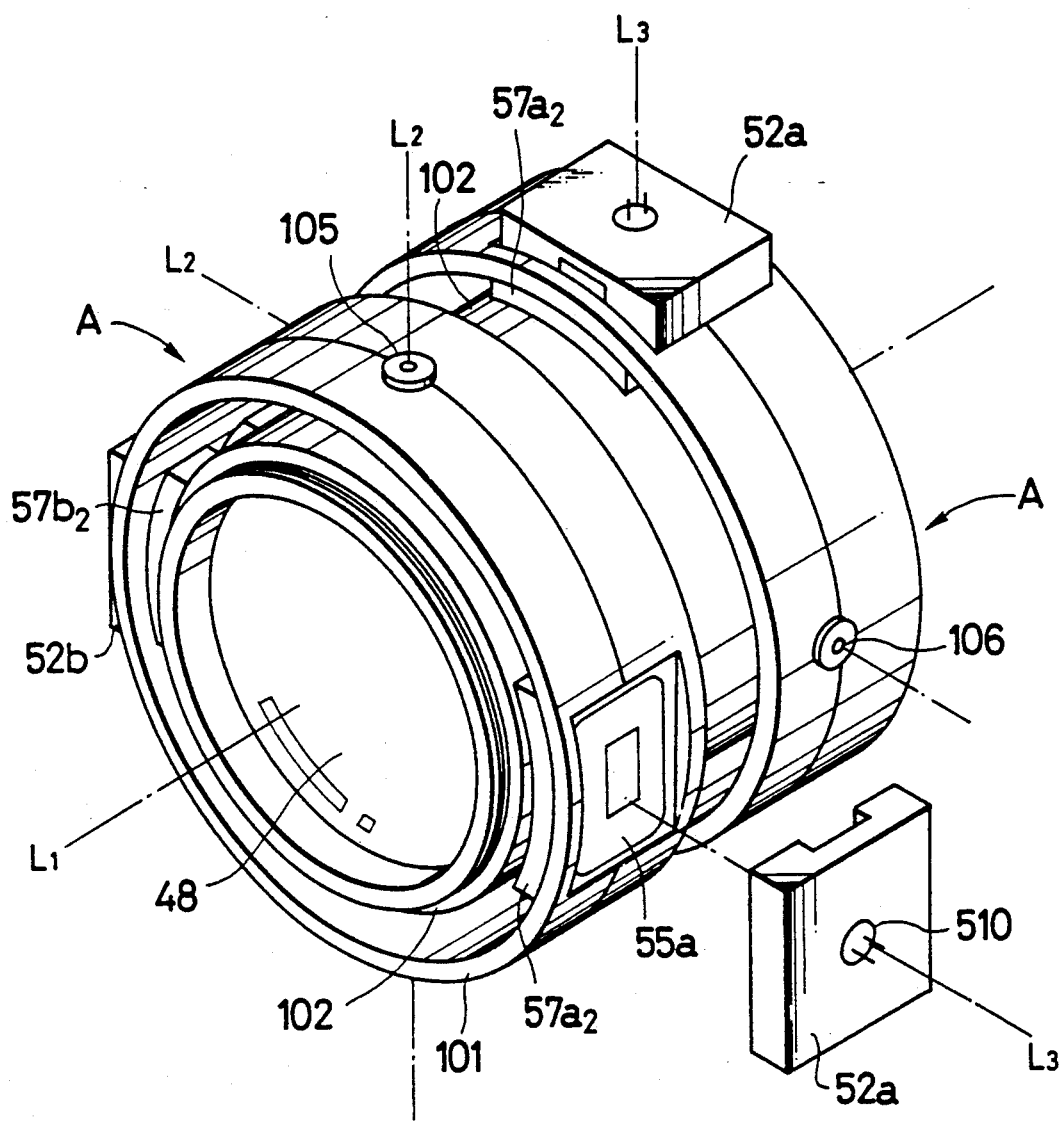
FIG. 6 is a perspective view of a lens tube incorporating the angular acceleration meter shown in FIG. 5.
Figure 7:
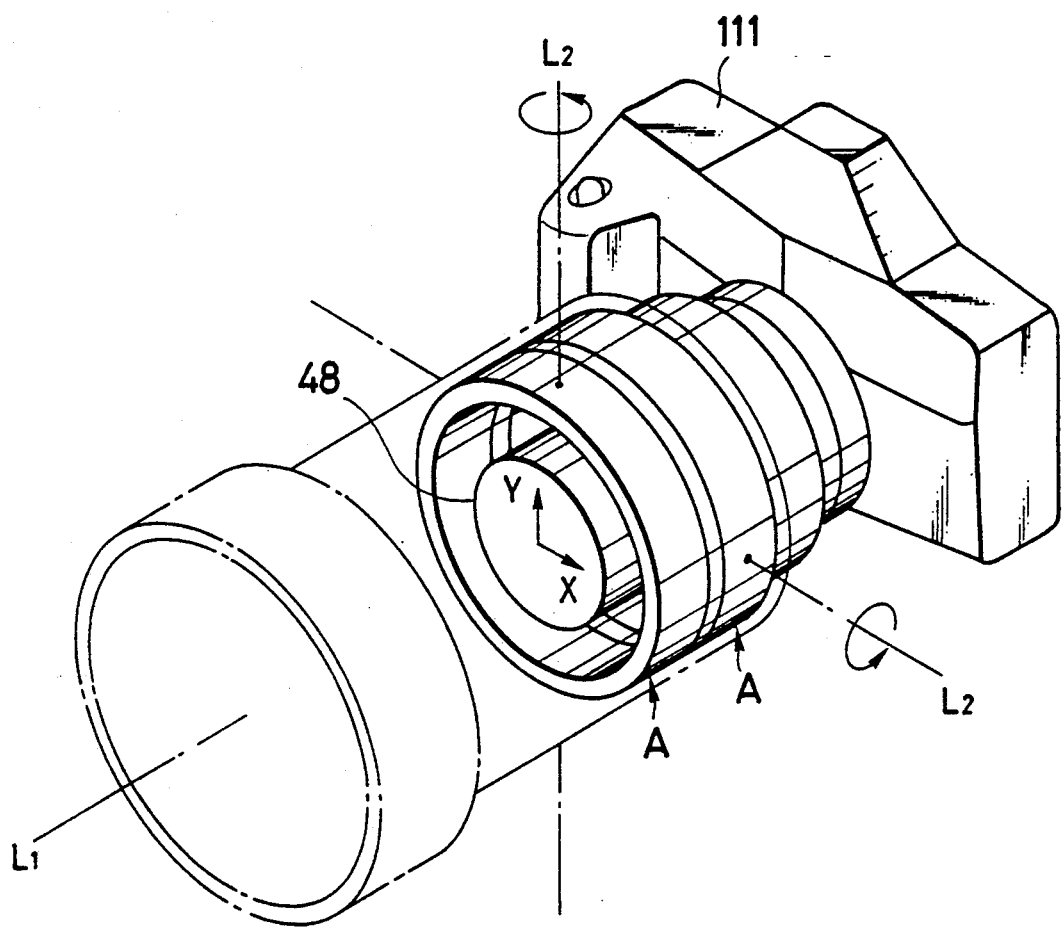
FIG. 7 is a perspective view of a camera body on which the lens tube shown in FIG. 6 is mounted.

FIG. 6 shows an example of a lens tube incorporating the angular acceleration meter A of the present embodiment, and FIG. 7 shows a camera on which said lens tube is mounted. The control circuit to be connected to the coils 55a, 55b, position sensor 511 and light-emitting device 510 of said angular acceleration meter A for driving the same and determining the magnitude of the angular acceleration as shown in FIG. 17, is incorporated in the lens tube or in the camera body 111.

Said lens tube is provided with two sets of the angular acceleration meter A of the present embodiment, separate along the optical axis, with the first perpendicular axis L2 of the front angular acceleration member A twisted about the optical axis L1 from that of the rear acceleration meter. The front angular acceleration meter A serves to detect the yawing of the camera, while the rear one serves to detect the pitching of for camera. A correcting optical system 48 for compensating for camera shaking is housed in the second ring 102 of the acceleration meter A.

[Fifth embodiment]

Figure 8:
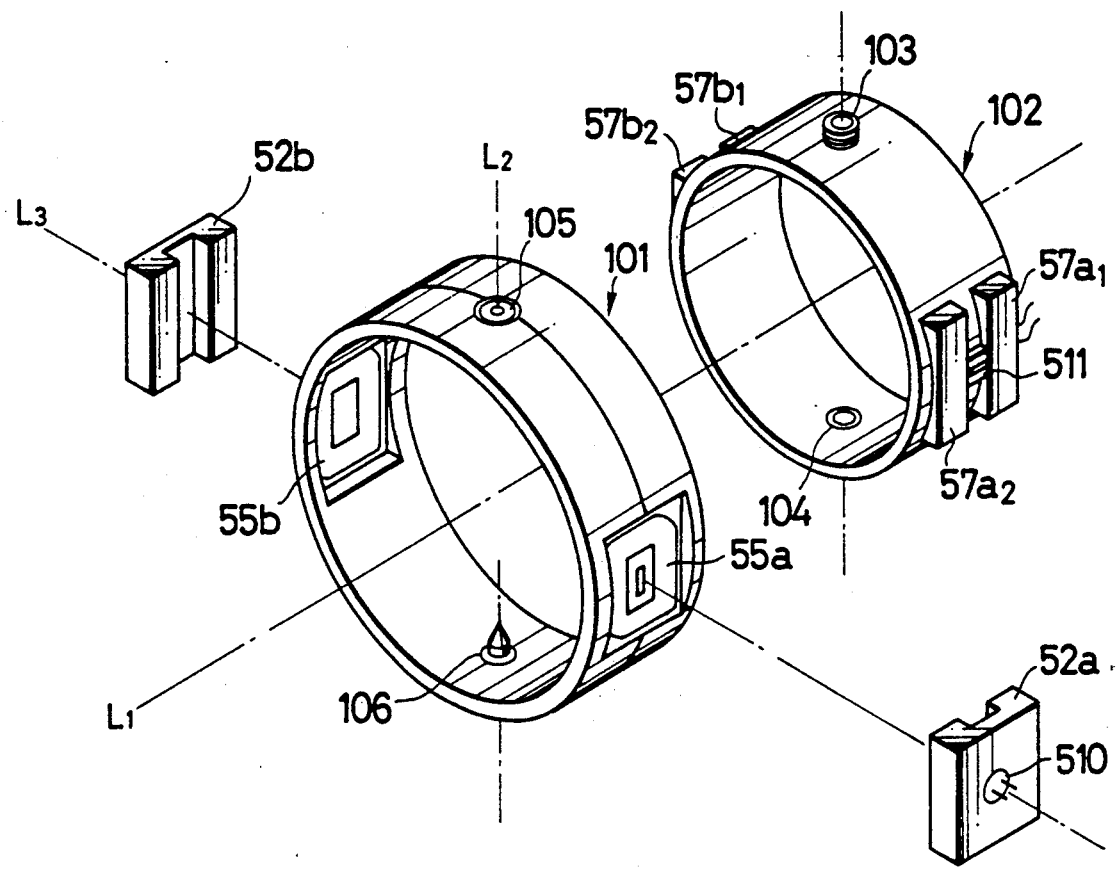
FIG. 8 is an exploded perspective view of a fifth embodiment of the angular acceleration meter.

FIG. 8 is an exploded perspective view of a fifth embodiment of the angular acceleration meter.

In the fourth embodiment shown in FIG. 5, the shafts 105, 106 are fitted in ball bearings 103, 104. In the present embodiment, the bearings 103, 104 are composed of pivot bearings for example utilizing jewels, and the shafts 105, 106 are formed as pivot shafts with pointed ends. Thus, as shown in FIG. 9B, the ends of shafts 105, 106 are supported in point contact with the bearings 103, 104.

Because of the reduced friction in comparison with the fourth embodiment employing ball bearings, the present embodiment enables detection of delicate angular acceleration. The advantages of the present embodiment now will be explained, with reference to FIG. 9A.

Figure 9A:
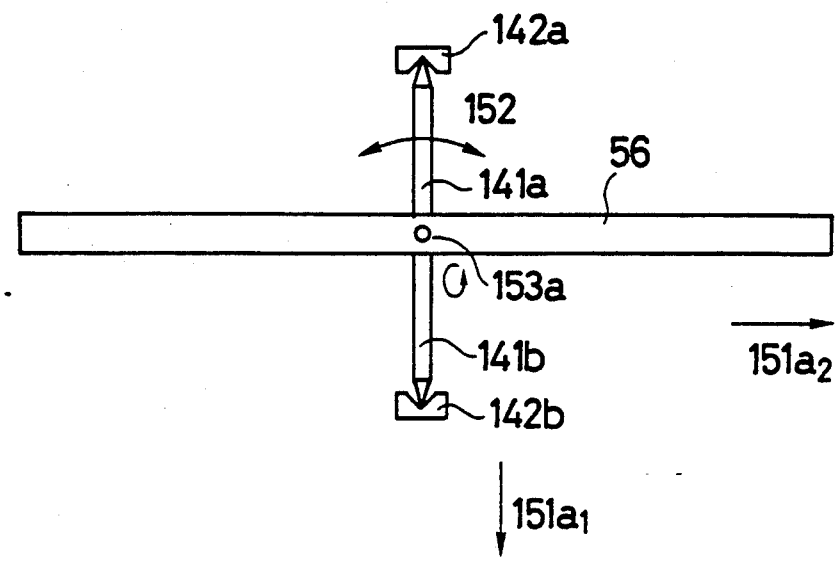
FIG. 9A is a cross-sectional view of a conventional angular acceleration meter.
Figure 9B:
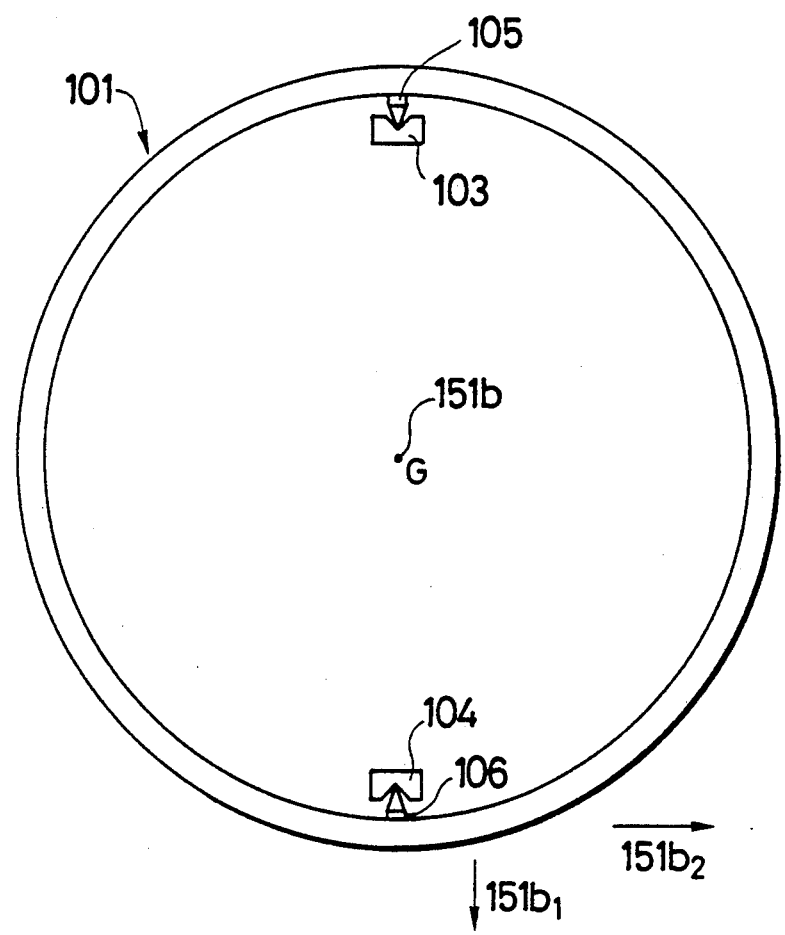
FIG. 9B is a cross-sectional view of the angular acceleration meter of the fifth embodiment.

FIG. 9A shows an angular acceleration meter with conventional pivot bearings. In comparison with the angular acceleration meter of the present embodiment shown in FIG. 9B, it will be apparent that the direction of pivot shaft and bearing is inverted.

In the structure shown in FIG. 9A, when the acceleration of gravity is in a direction 151a₂, the pivot shafts 141a, 141b are pressed to the pivot bearings 142a, 142b by the gravity of the seesaw 56 and are therefore stable. However, when the acceleration of gravity is in a direction 151$a_1$, the pivot shaft 141b is pressed to the pivot bearing 142b but a small gap is formed between the pivot shaft 141a and the pivot bearing 142a. Since the center of gravity 153a of the seesaw 56 is positioned above the pivot shaft 141b and pivot bearing 142b supporting the seesaw 56, said seesaw 56 constitutes an inverted pendulum, forming a play in a direction 152 and generating an error in the measured angular acceleration.

In the present embodiment shown in FIG. 9B, the first ring 101 is supported by the bearing 103 and the shaft 105 positioned above the center of gravity G (151b) even when the acceleration of gravity is applied in the direction 151$b_1$. Thus the seesaw, assuming the form of so-called balancing toy, is extremely stably supported, and enables precise detection of the angular acceleration in combination with the extended distance between the bearings as explained in the fourth embodiment.

[Sixth embodiment]

Figure 10:
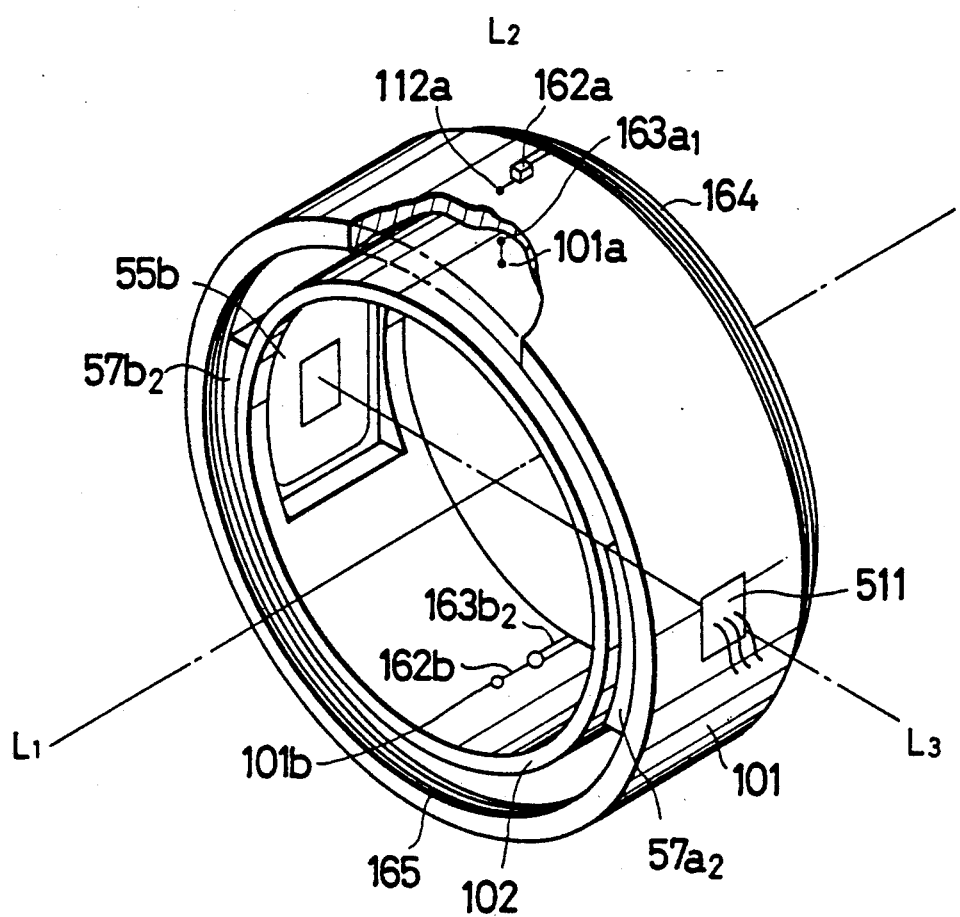
FIG. 10 is a perspective view of a sixth embodiment the angular acceleration meter.

FIG. 10 is a perspective view of a sixth embodiment of the angular acceleration meter.

In the present embodiment, the second tube 102, to be incorporated in the first ring 101, is rotatably supported by torsion wires 162a, 162b. Said torsion wires 162a, 162b, known under the name of Tortband, are made to pass through holes 112a, 112b (not shown) radially formed in the symmetrical positions of the first ring 101 along the first perpendicular axis L2, and those 101a, 101b radially formed in the symmetrical positions of the second 102. Ends of said torsion wires engage with hooks 163$a_1$, 163$a_2$ (not shown) fixed on the external periphery of the first ring 101, while the other ends engage with hooks 163$b_1$ (not shown), 163$b_2$ fixed on the internal periphery of the first ring 101.

A position sensor 511 is mounted on the first ring 101. Paired permanent magnets 57$a_1$ (not shown) 57$a_2$ and those 57$b_1$ (not shown), 57$b_2$ are mounted on the internal surface of the first ring 101 in mutually opposed manner along the second perpendicular axis L3. A coil 55a (not shown) having a slit 59 (not shown) and another coil 55b are mounted in mutually opposed manner on the second ring 102, along the second perpendicular axis L3. A light-emitting device 510 (not shown) is mounted by an unrepresented member on the first ring 101 in opposed manner to a position sensor 511, whereby the light from the light-emitting device 510 is received by the position sensor 511 through the slit 59 for detecting the angular acceleration The front and rear ends of the first ring 101 are respectively provided with a female screw 165 and a male screw 164 for connection of two acceleration meters or connection with the optical system as shown in FIG. 6.

In the present embodiment, the first ring 101 is supported under tension by means of the torsion wires 162a, 162b, so that the relative rotation between first and second rings 101, 102 can be achieved without play in comparison with the ball bearings or pivot bearings, thus enabling the measurement of angular acceleration with an increased precision.

In the present embodiment, the magnets and position sensor are mounted on the first ring 101 while the coils are mounted on the second ring 102, but it is also possible, as in the foregoing embodiments, to mount the coils on the first ring ]101 and the magnets and position sensor on the second ring 102.

[Seventh embodiment]

Figure 11:
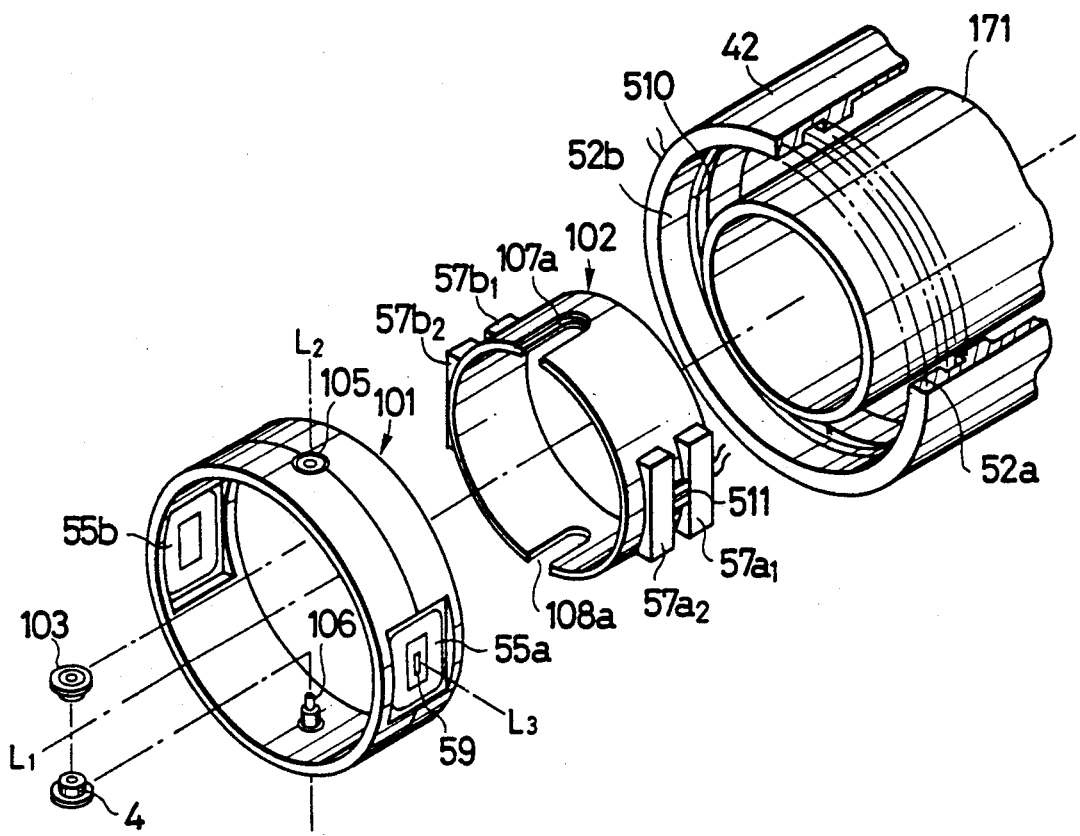
FIG. 11 is an exploded perspective view of a seventh embodiment of the angular acceleration meter.

FIG. 11 is an exploded perspective view of a seventh embodiment of the angular acceleration meter.

The present embodiment is integrally combined with a lens tube, in which the magnetic circuit plate 52a with the light-emitting device 510 and the magnetic circuit plate 52b, in the fourth embodiment shown in FIG. 5, are formed as a part of an outer tube 42 of the lens tube, while the second ring 102 is fitted on a tube 171 supporting the correcting optical system, and the first ring 101 is maintained in a free state.

The present embodiment can reduce the number of component parts and can therefore reduce the fabrication cost, as the magnetic circuit plates 52a, 52b are formed as a part of the outer tube 182.

In FIG. 11, the light-emitting device 510 is positioned radially opposite to the position sensor 511, but in fact it is positioned facing the position sensor 511, and the illustration is merely to indicate that the light-emitting device 510 is positioned on the internal periphery of the outer tube 142.

[Eighth embodiment]

FIG. 12 is an exploded perspective view of an eighth embodiment of the angular acceleration meter.

The foregoing fourth to seventh embodiments disclose servo angular acceleration meters in which the relative rotation between the first and second rings 101, 102 is restricted by closed magnetic circuits composed of permanent magnets, coils and magnetic circuit plates. On the other hand, in the present embodiment, the relative rotation between the first and second rings 101, 102 is mechanically restricted by spiral springs 131a (not shown), 131b. Said spiral springs 131a, 131b are respectively provided around the shafts 105, 106 inside the first ring 101, and ends 131$a_1$, 131$b_1$ of said springs are fixed on the first ring 101, while the other ends 131$a_2$, 131$b_2$ thereof are fixed on the second ring 102.

The first ring 101 is provided with a slit 59, while the second ring 102 is provided with a position sensor 511 fixed thereon, so that the detection of angular acceleration is achieved by receiving the light, from the light-emitting device 510 fixed for example on the lens tube, by means of the position sensor 511 through the slit 59.

The angular acceleration meter of the present embodiment can provide a high sensitivity comparable to that obtained in the above-explained servo-angular acceleration meters, since the first ring 101 has a large moment of inertia and the force of the spiral springs 131a, 131b can be made very weak.

Also the control circuit can be significantly simplified since the coils and the permanent magnets can be dispensed with.

[Ninth embodiment]

Figure 13:
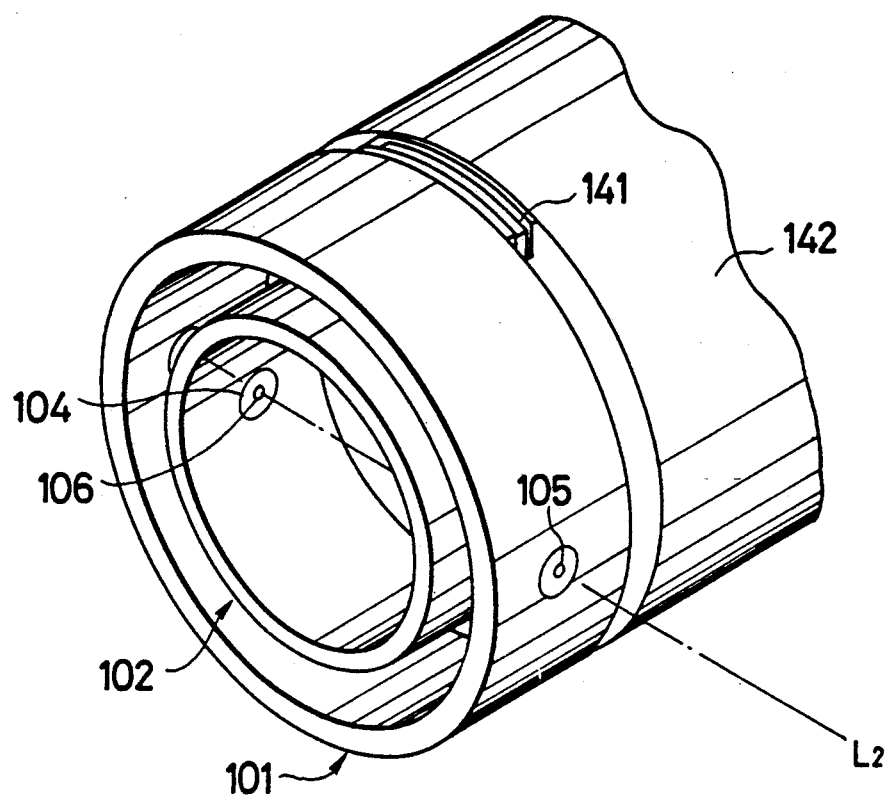
FIG. 13 is an exploded perspective view of a ninth embodiment of the angular acceleration meter.

FIG. 13 is a perspective view of a ninth embodiment of the angular acceleration meter.

In the present embodiment, the first and second rings 101, 102 are mutually rotatably linked for example with shafts 105, 106 and bearings 103, 104 as shown in FIG. 5, and are mounted on the lens tube. A piezoelectric member 141, for converting pressure into electric signals, is mounted on the front end of a tubular fixing member 142 fixed on the lens tube, and is maintained in contact with the rear end of the first ring 101.

Since the piezoelectric member 141 is itself elastic, the first ring 101 rotates while being resiliently supported by said piezoelectric member 141. Thus there is obtained a piezoelectric angular acceleration meter in which the rotation of the first ring 101 can be detected as the output signal of the piezoelectric member 141, and which can be simplified in structure in comparison with the foregoing embodiments.

[Tenth embodiment]

Figure 14:
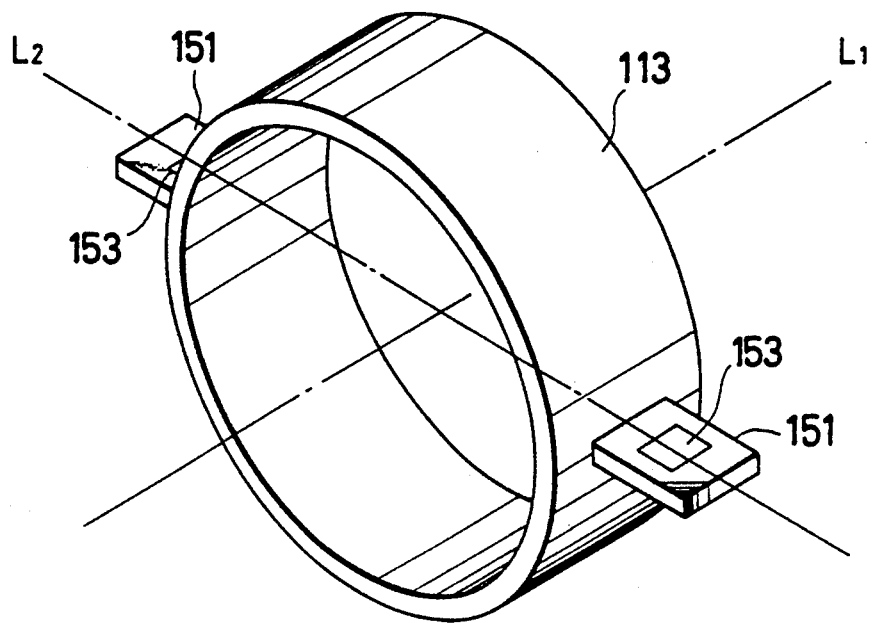
FIG. 14 is a perspective view of a tenth embodiment of the angular acceleration meter.
Figure 15:
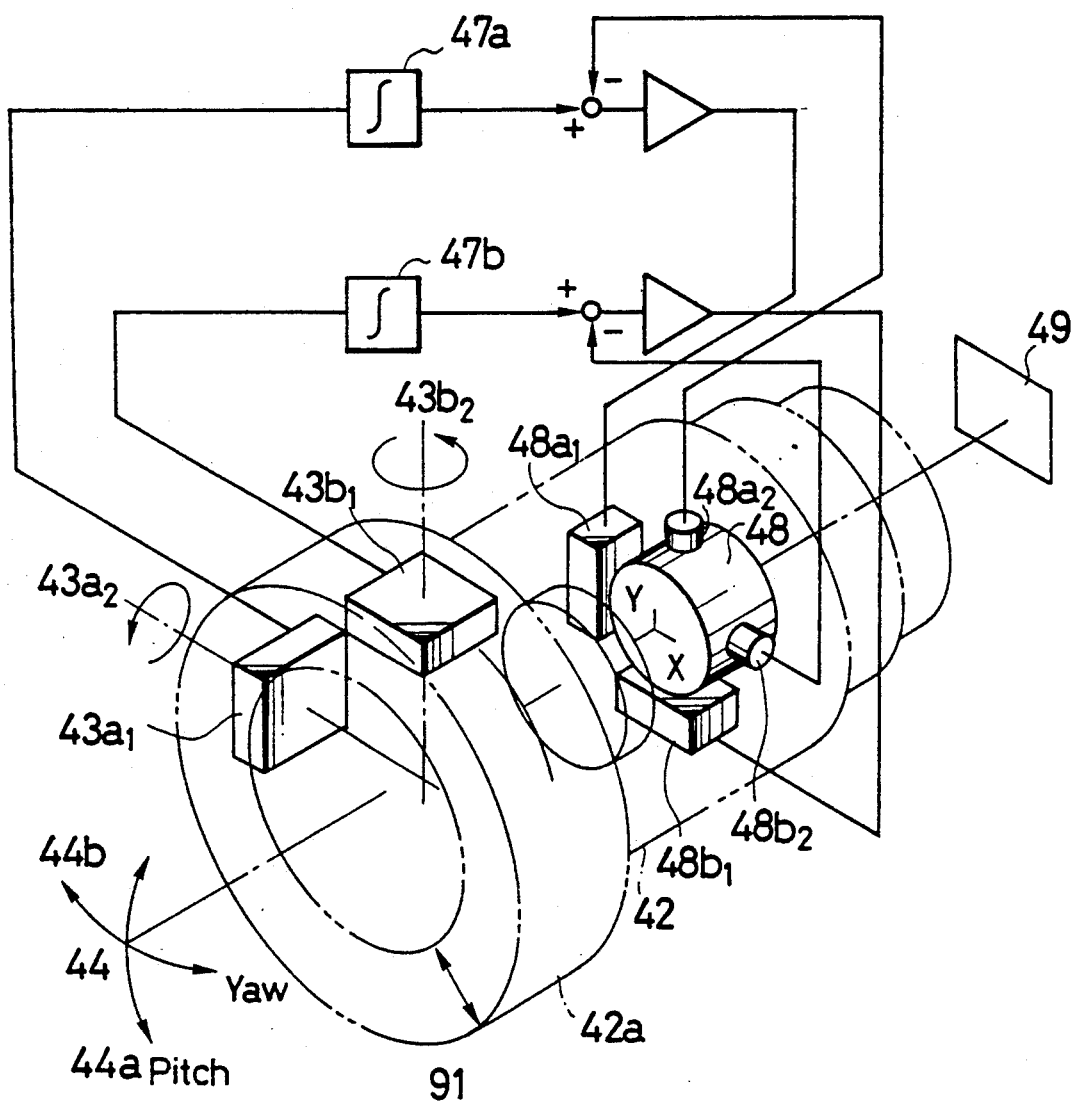
FIG. 15 is a view showing an example of a camera shaking detecting system employing an angular acceleration meter.

FIG. 14 is a perspective view of a tenth embodiment of the angular acceleration meter.

In the present embodiment, plate springs 151 are extended in radially opposed positions, corresponding to the first perpendicular axis L2, from a cylindrical while the second ring 102 is provide with a position ring 113, and are fixed at the outer ends on an unrepresented outer tube surrounding the cylindrical ring 13, and strain gauges 153 of semiconductor type or resistor type are adhered on said plate springs 151.

Thus the ring 113 is elastically supported by the outer tube through the paired plate springs 151, which are twisted under the effect of an angular acceleration causing a relative rotation between the ring 113 and the outer tube about the first perpendicular axis L2. Said twisting can be detected with the strain gauges 153, and the angular acceleration can therefore be determined.

The present embodiment results in a simplified structure, and the aforementioned shafts and bearings can be dispensed with.

In the embodiments described above, description has been made in connection with angular acceleration. However, it would be apparent that the present invention is applicable to a device using a known linear acceleration meter.

What is claimed is:

1. An angular acceleration meter for detecting angular acceleration of an object, comprising:
   (a) sensing mass formed into a shape corresponding to a shape of the object;
   (b) supporting means for movably supporting said sensing mass relative to the object; and
   (c) angular acceleration sensing means for measuring an angular acceleration of said sensing mass relative to the object.

2. An angular acceleration meter according to claim 1, wherein said supporting means comprises means for rotatably supporting said sensing mass relative to the object.

3. An angular acceleration meter according to claim 1, wherein said sensing mass is formed as a curved surface following a configuration of the object.

4. An angular acceleration meter according to claim 1, wherein said sensing mass is formed as a polyhedron following a configuration of the object.

5. An angular acceleration meter according to claim 1, wherein said sensing mass is formed in a plate-like shape following a configuration of the object.

6. An angular acceleration meter according to claim 1, wherein said sensing mass is formed in a bar-like shape following a configuration of the object.

7. An angular acceleration meter according to claim 1, wherein said sensing mass comprises a balance adjusting means.

8. An acceleration meter according to claim 1, wherein said sensing mass is formed in a ring-like shape following a configuration of the object.

9. An acceleration meter according to claim 1, wherein said sensing mass is formed in a cylinder-like shape following a configuration of the object.

10. An acceleration meter according to claim 1, wherein said angular acceleration sensing means comprises optical means for detecting a deviation state of said sensing mass relative to the object.

11. An acceleration meter according to claim 10, wherein:
   said optical means comprises light projection means for projecting a signal light; and
   light receiving means for receiving the projected signal light.

12. An acceleration meter according to claim 11, wherein said light receiving means comprises means for detecting a light receiving position of the projected signal light.

13. An acceleration meter according to claim 12, wherein said angular acceleration sensing means comprises driving means for compensating a deviation of light receiving portion by shifting said sensing mass in accordance with the deviation state, said angular acceleration sensing means detecting the angular acceleration of the object on the basis of a driving state of said driving means.

14. An acceleration meter according to claim 13, wherein said driving means comprises an electro-magnetic driving means.

15. An acceleration meter according to claim 1, wherein said angular acceleration sensing means comprises driving means for compensating a relative movement of said sensing mass to the object, said angular acceleration sensing means detecting the angular acceleration of the object on the basis of a driving state of said driving means.

16. An acceleration meter according to claim 15, wherein said driving means comprises an electro-magnetic driving means.

17. An acceleration meter according to claim 15, wherein said driving means comprises elastic means.

18. An acceleration meter according to claim 1, wherein said angular acceleration sensing means comprises piezo-electric means for detecting a moving state of said sensing mass relative to the object.

19. An acceleration meter according to claim 1, wherein said angular acceleration sensing means comprises a strain gauge for detecting a moving state of said sensing mass relative to the object.

20. An acceleration meter according to claim 1, wherein the object is a lens barrel.

21. An angular acceleration meter according to claim 1, wherein said sensing mass is formed as a curved surface and the object is a lens barrel.

22. An angular acceleration meter according to claim 1, wherein said sensing mass is formed as a polyhedron and the object is a lens barrel.

23. An angular acceleration meter according to claim 1, wherein said sensing ass is formed in a plate-like shape and the object is a lens barrel.

24. An angular acceleration meter according to claim 1, wherein said sensing mass is formed in a bar-like shape and the object is a lens barrel.

25. An angular acceleration meter according to claim 1, wherein said sensing mass is formed in a ring-like shape and the object is a lens barrel.

26. An angular acceleration meter according to claim 1, wherein said sensing mass is formed in a cylinder-like shape and the object is a lens barrel.

* * * * *

UNITED STATES PATENT AND TRADEMARK OFFICE
CERTIFICATE OF CORRECTION

PATENT NO. : 5,020,369
DATED : June 4, 1991
INVENTOR(S) : Koichi WASHISU, et al.

It is certified that error appears in the above-identified patent and that said Letters Patent is hereby corrected as shown below:

COLUMN 2:

Line 68, "acceleration." should read --acceleration a--.

COLUMN 11:

Line 39, "sensing mass" should read --a sensing mass--.

COLUMN 12:

Line 57, "ass" should read --mass--.

Signed and Sealed this

Eighth Day of December, 1992

Attest:

DOUGLAS B. COMER

Attesting Officer

Acting Commissioner of Patents and Trademarks